(12) United States Patent
Pierce et al.

(10) Patent No.: US 8,997,902 B2
(45) Date of Patent: Apr. 7, 2015

(54) WINDROWER STEERING SYSTEM

(71) Applicant: CNH America, LLC, New Holland, PA (US)

(72) Inventors: Todd B. Pierce, East Petersburg, PA (US); Philip J. Ehrhart, Narvon, PA (US); Jeffrey Fay, II, Lititz, PA (US); Mark D. Layton, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/905,521

(22) Filed: May 30, 2013

(65) Prior Publication Data

US 2014/0357446 A1  Dec. 4, 2014

(51) Int. Cl.
*B62D 5/04* (2006.01)
*B62D 11/00* (2006.01)

(52) U.S. Cl.
CPC ..................... *B62D 11/005* (2013.01)

(58) Field of Classification Search
USPC .............. 180/6.2, 6.32, 6.26, 6.48; 701/50
See application file for complete search history.

(56) References Cited

U.S. PATENT DOCUMENTS

| | | | |
|---|---|---|---|
| 1,994,806 A | 3/1935 | Barrett | |
| 3,550,708 A | 12/1970 | Paramythioti | |
| 3,901,339 A | 8/1975 | Williamson | |
| 4,603,752 A | 8/1986 | Chambers et al. | |
| 4,809,173 A * | 2/1989 | Fukami et al. | 701/43 |
| 7,082,361 B2 * | 7/2006 | Berger et al. | 701/93 |
| 7,133,758 B2 | 11/2006 | Otto et al. | |
| 7,207,581 B2 | 4/2007 | Osborne et al. | |
| 7,408,450 B2 | 8/2008 | Chow et al. | |
| 7,539,571 B2 | 5/2009 | Strosser et al. | |
| 7,596,440 B2 * | 9/2009 | Ono | 701/41 |
| 7,603,218 B2 * | 10/2009 | Fackler et al. | 701/50 |
| 7,793,755 B2 * | 9/2010 | Ogasawara | 180/446 |
| 7,878,294 B2 * | 2/2011 | Morikawa | 180/444 |
| 7,881,844 B2 | 2/2011 | Strosser | |
| 2011/0242773 A1 * | 10/2011 | Tani | 361/748 |
| 2013/0158806 A1 * | 6/2013 | Sugiyama et al. | 701/41 |

\* cited by examiner

*Primary Examiner* — Kevin Hurley
*Assistant Examiner* — Michael Stabley
(74) *Attorney, Agent, or Firm* — Seyed V. Sharifi T.; Patrick M. Sheldrake

(57) ABSTRACT

A steering system for a differential steered self-propelled agricultural windrower, windrower speed and direction controlled by adjusting the pivotal position of rotatable pintel arms to control the output of a pair of tandem-mounted hydraulic drive pumps and provide motive power for the windrower. A control input shaft that is both rotatable and axially moveable manages the relative positioning of the pintel arms. A hydraulic steering motor is operably connected to the input shaft. Rotation of the hydraulic steering motor is managed by a steering control valve attached to a cab-mounted windrower steering wheel.

9 Claims, 4 Drawing Sheets

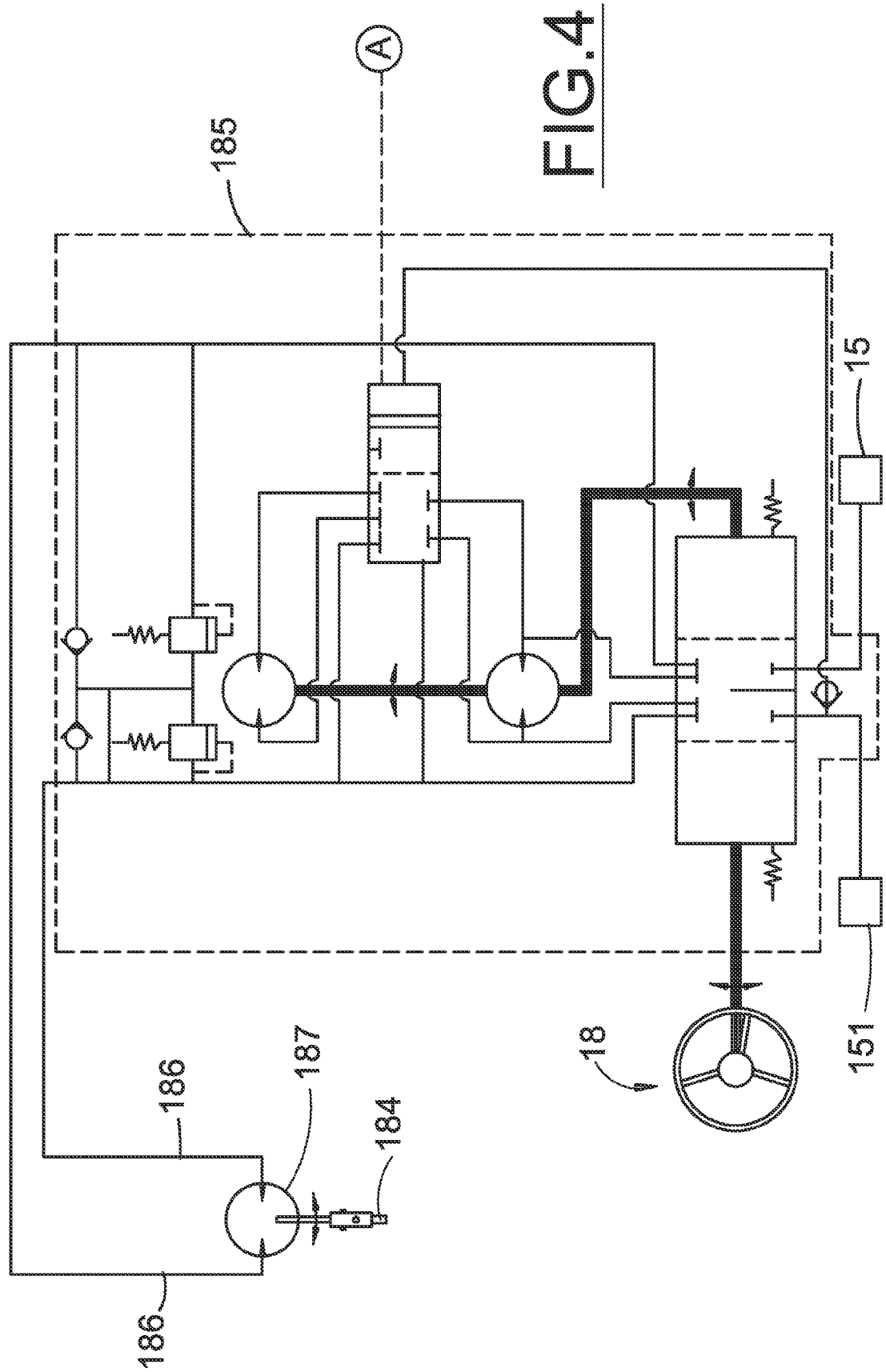

WINDROWER STEERING SYSTEM

CROSS REFERENCE TO RELATED APPLICATIONS

This application is related to U.S. patent application entitled "Control Group Mounting Relative to Controlled Hardware", Ser. No. "13/905,513", filed on May 30, 2013; and U.S. patent application entitled "Windrower Autoguidance Hydraulic Steering Interface", Ser. No. "13/309,528", filed on May 30, 2013. The above applications are herein incorporated by reference.

BACKGROUND OF THE INVENTION

The present invention relates generally to hydraulically powered differential steered agricultural machines, and more particularly to an improved steering system for such machines.

Hydrostatic drive systems are often configured with the drive pump attached directly to the engine without a clutch or other mechanism to stop output flow of the pump while the engine is running. Drive pump displacement (output) and therefore speed in differential-steered machines is controlled by variations in swashplate angle which is adjusted by movement of external pintel arms external to the pumps. On most pumps, pintel arm and thus swashplate rotation from "neutral" to "full speed" occurs over a relatively narrow range on the order of 16-18 degrees. With such a small range of motion, it is important that the assembly controlling the angular position of the pintel arm angles be capable of precise angular control. Precise control of the swashplate angle for hydrostatic ground drive pumps on differential-steered agricultural machines is paramount, especially when operating the machine at higher travel speed such as is necessary for road transport between fields.

Conventional mechanical mechanisms use a threaded interface between a rotating shaft controlled by a steering wheel and the pintels arms on the drive pumps. Steering rate (generally, the number of steering wheel turns from full right lock to full left lock) is established by the thread pitch on this control interface and is selected to balance steering precision with an ergonomically acceptable steering rate. As thread pitch is not readily adjustable, the steering rate is a compromise between low-speed maneuverability, such as during harvesting operations, and high speed stability, such as during over-the-road transport.

SUMMARY OF THE INVENTION

It would be of great advantage to provide a steering control assembly for managing pintel arm positioning on a hydrostatic, differential steered agricultural machine that improves steering sensitivity and precision. Additional advantages would be realized by an improved mounting system that is easily incorporated into the existing swashplate control design commonly used on current model hydrostatic drive differential-steered machines.

In a first embodiment of the present invention comprises a hydrostatic drive differential-steered machine having left- and right-side drive pumps tandem-mounted to an engine, each drive pump having an angularly adjustable swash plate moveable by a pivoting pintel arm and a control linkage for simultaneously moving the pintel arms. The pintel arms are moveable in a range from full forward speed to full reverse speed with an intermediate neutral position to enable forward and reverse travel as well as turning of the machine. The control linkage is configured to move the pintel arms in unison by linear motion of the control linkage and to move the pintel arms in opposition by rotary motion of the control linkage. A first input to the control linkage is by a hydraulic steering motor to rotate the control linkage for steering the machine by adjusting the differential speed of the left and right wheels. A steering control valve connected to a steering wheel manages the input for rotating the hydraulic steering motor. The steering control valve is selected to produce a steering gain (e.g., the turn rate of the steering motor is greater than the turn rate of the steering wheel) allowing the increased precision in the interface between the control linkage and the pintel arms. A second input to the control linkage is a linear actuator, movement of which is managed by a forward-neutral-reverse (FNR) lever accessible to the machine operator, to adjust the speed of the wheels uniformly. The linear actuator is connected at one end to the control linkage and to a bracket connected to the drive pumps at the opposite end so that the linear actuator and the pumps share a common anchorage, namely the resiliently mounted engine and hydraulic pumps, further improving steering precision and sensitivity.

These and other objects of the invention are addressed by a steering system for a differential steered self-propelled agricultural windrower, windrower speed and direction controlled by adjusting the pivotal position of rotatable pintel arms to control the output of a pair of tandem-mounted hydraulic drive pumps and provide motive power for the windrower. A control input shaft that is both rotatable and axially moveable manages the relative positioning of the pintel arms. A hydraulic steering motor is operably connected to the input shaft. Rotation of the hydraulic steering motor is managed by a steering control valve attached to a cab-mounted windrower steering wheel.

DESCRIPTION OF THE DRAWINGS

The advantages of this invention will be apparent upon consideration of the following detailed disclosure of the invention, especially when taken in conjunction with the accompanying drawings wherein:

FIG. 4 is a diagram of a first embodiment of the hydraulic steering control circuit for the windrower of FIG. 1.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
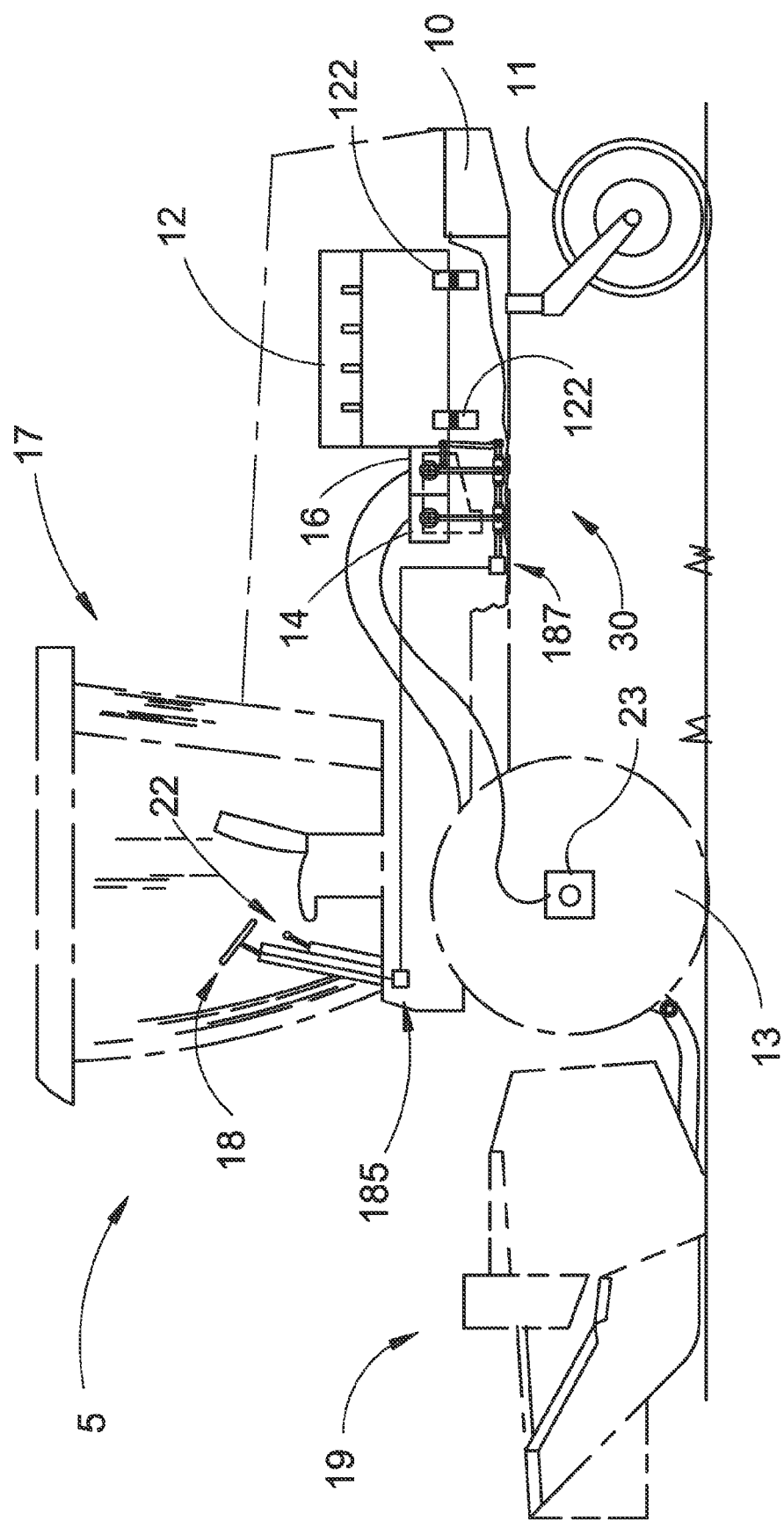
FIG. 1 is a side elevation view of a known differential steered agricultural windrower of the type with which the instant invention finds utility.

FIG. 1 illustrates an agricultural machine 5 of the type on which the present invention finds utility. The machine 5 illustrated is a well-known, self-propelled agricultural windrower employing differential speed of the driving wheels to steer the machine across the ground. The machine comprises a main frame 10 with a longitudinal horizontal axis from front to back, supported by a pair of drive wheels 13 on the front portion thereof and by a pair of steering caster wheels 11 adjacent to the rear end. The main frame 10 supports an operator cab 17 to provide an environmentally controlled location from which the machine may be comfortably operated, and a forwardly disposed header 19. Header 19 may be of several designs, but typically comprises a cutting mechanism, either a sickle bar or rotary cutter, a feeder mechanism, and, on some models, conditioning rolls.

Power to the machine is provided by an engine 12 which is resiliently connected by isolators 122 to the main frame 10 to reduce vibration transmitted into the main frame 10 by the engine 12. The general mode of operation of a modern differential steered agricultural machine is to have tandem hydrostatic pumps 14, 16, one for each of two drive wheels 13, each pump having a depending pintel arm such that forward and reverse movement of the pintel arm relative to a neutral position pivots a swashplate in the associated hydrostatic pump allowing adjustment of the flow rate and flow direction, thus causing the associated drive motor 23 and wheel to rotate. The hydrostatic drive pumps 14, 16 are mounted in tandem directly to the engine 12. Control of the drive pumps from the operator cab 17 is accomplished by operator input from a steering wheel 18 (turning control) and a forward-neutral-reverse (FNR) speed selector 22 operably connected to a drive control mechanism 30 adjacent to the drive pumps 14, 16. A detailed description of a differential steered agricultural machine is provided in U.S. Pat. No. 7,207,581 issued to Osborne, et al., the entirety of which is incorporated herein by reference.

Figure 2:
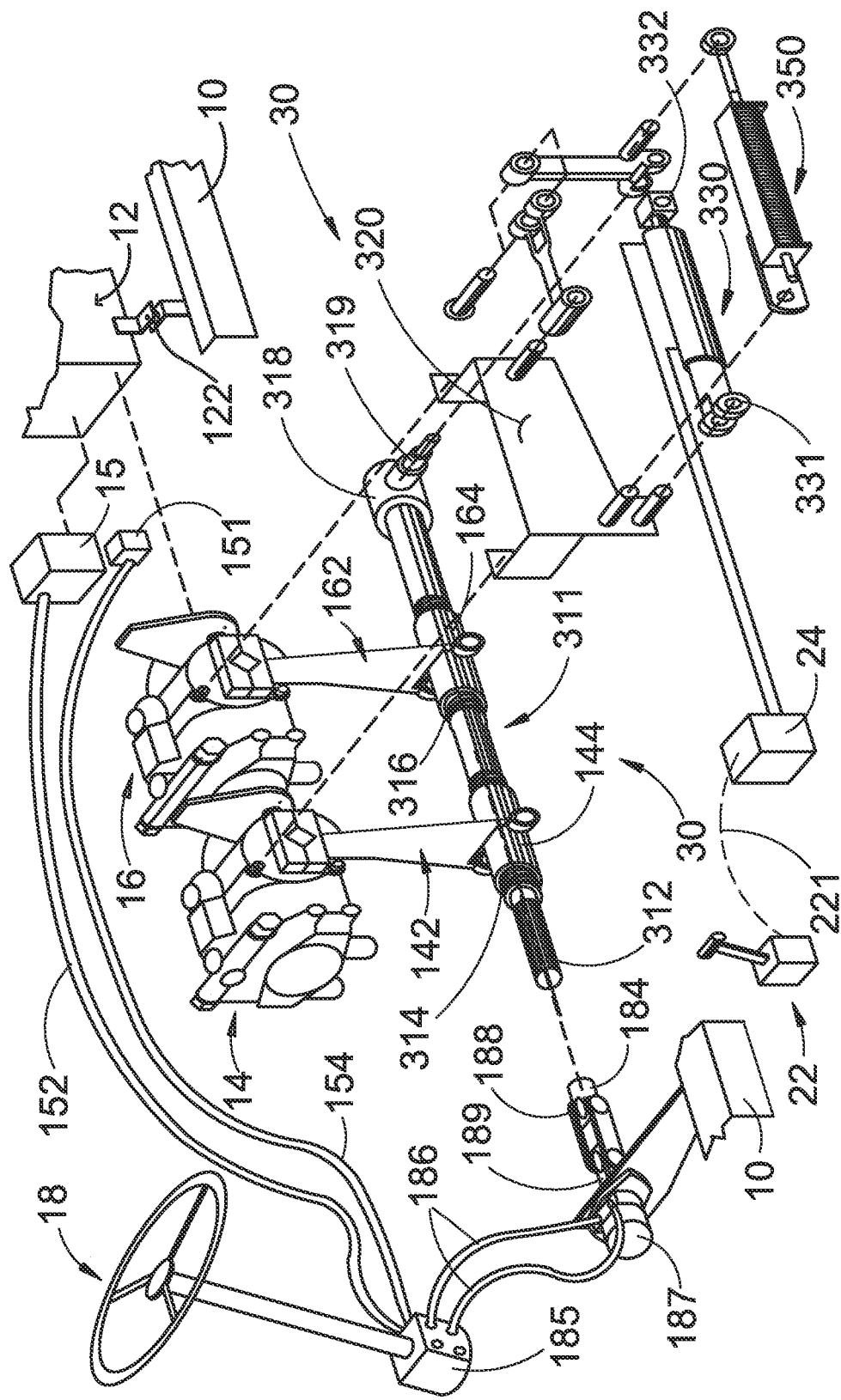
FIG. 2 is a partial left side view of the hydrostatic control system for the windrower of FIG. 1 showing the drive pump control mechanism and mounting.

Referring now to FIG. 2, an exemplar hydrostatic control system is shown to include a conventional steering wheel 18 inside the operator's cab 17. The cab would, of course, include additional components (not shown) such as a seat, electrical and mechanical controls for operation of the machine, an air conditioning unit, and the like. The steering wheel 18 is attached to a rotatable steering shaft 182 that is connected to a steering control valve 185 which directs a flow of pressurized hydraulic fluid to a steering drive motor 187. An output shaft 189 from the steering drive motor is, in turn, connected to the drive control mechanism 30 by a universal joint 188 and a sliding coupling 184. The universal connector is well known in the art as a mechanism to transmit rotational movement between two shafts that are not necessarily in axial alignment. Minor axial misalignment may occur as the steering drive motor 187 is connected to main frame 10 while the drive control mechanism 30 is connected to the resiliently mounted engine 12.

The drive control mechanism 30 comprises a control input shaft 311 that engages pintel arms 142, 162 via internally threaded blocks 144, 164 to operably connect the control input shaft to the respective left and right hydrostatic drive pumps 14, 16. The pintel arm blocks 144, 164 engage drive threads 314, 316 on the control input shaft. The drive threads 314, 316 are reversed in relation to each other (one having right-hand thread and the other having left-hand threads) so that rotation of the input shaft 311 causes the blocks 144, 164 to move in opposite directions, either toward one another or away from one another dependent upon the rotation direction of the input shaft 311. This opposing motion in turn causes the pintel arms 142, 162 to rotate in opposite directions, one pintel arm rotating in a clockwise direction and the other rotating in a counter-clockwise direction, when viewed from the side, and alters the displacement of the drive pumps in an opposing manner (e.g., increase output flow in one while decreasing output flow in the other) allowing the machine to be steered by movement of the steering wheel 18. If the machine is in motion, this causes one drive pump to increase flow and the other to decrease flow, turning the machine; however, if the system is already in mechanical neutral, turning the steering wheel 18 increases flow in both pumps, but in opposite directions—the machine turning around itself with one drive wheel 13 going forward and one going in reverse.

Control input shaft 311 is also moveable axially to control the drive pumps 14, 16. The steering drive motor output shaft 189 includes a sliding coupling comprising sleeve 184 and splined end 312 for connecting to the control input shaft 311. The splined interface allows longitudinal movement of the control input shaft 311 relative to the output shaft 189. As the control input shaft is moved axially, the pintel arm blocks 144, 164 are moved forwardly or rearwardly causing the pintel arms 142, 162 to rotate in the same direction (either clockwise or counter-clockwise). Within cab 17 is the FNR lever 22 that is continuously and selectively movable to allow a change in speed of the machine in either the forward or reverse directions. Output 221 from the FNR lever 22 controls a hydraulic valve 24 which causes FNR actuator 330 to extend or retract.

Actuator 330 is connected at first end 332 to a spindle 319 on knuckle 318 which is mounted on control input shaft 311. The knuckle 318 allows rotation of the input shaft 311 while maintaining a fixed axial position on the shaft. An opposing second end 331 of actuator 330 is fixed in relation to the drive pumps 14, 16 by connection to bracket 320. As the actuator 330 is extended or retracted by user-selectable input of the FNR lever 22, the control input shaft 311 is moved forwardly or rearwardly. A stabilizing linkage is provided to guide movement of the knuckle 318 to avoid deflecting the input shaft 311 from its longitudinal axis and further improves movement of the control input shaft 311. A neutral bias element 350 connects between the control input shaft 311 and the bracket 320 to bias the control input shaft 311 into a neutral position, that is one in which the drive pump output flows are essentially zero when the steering control is aligned for straight-ahead travel.

Figure 3:
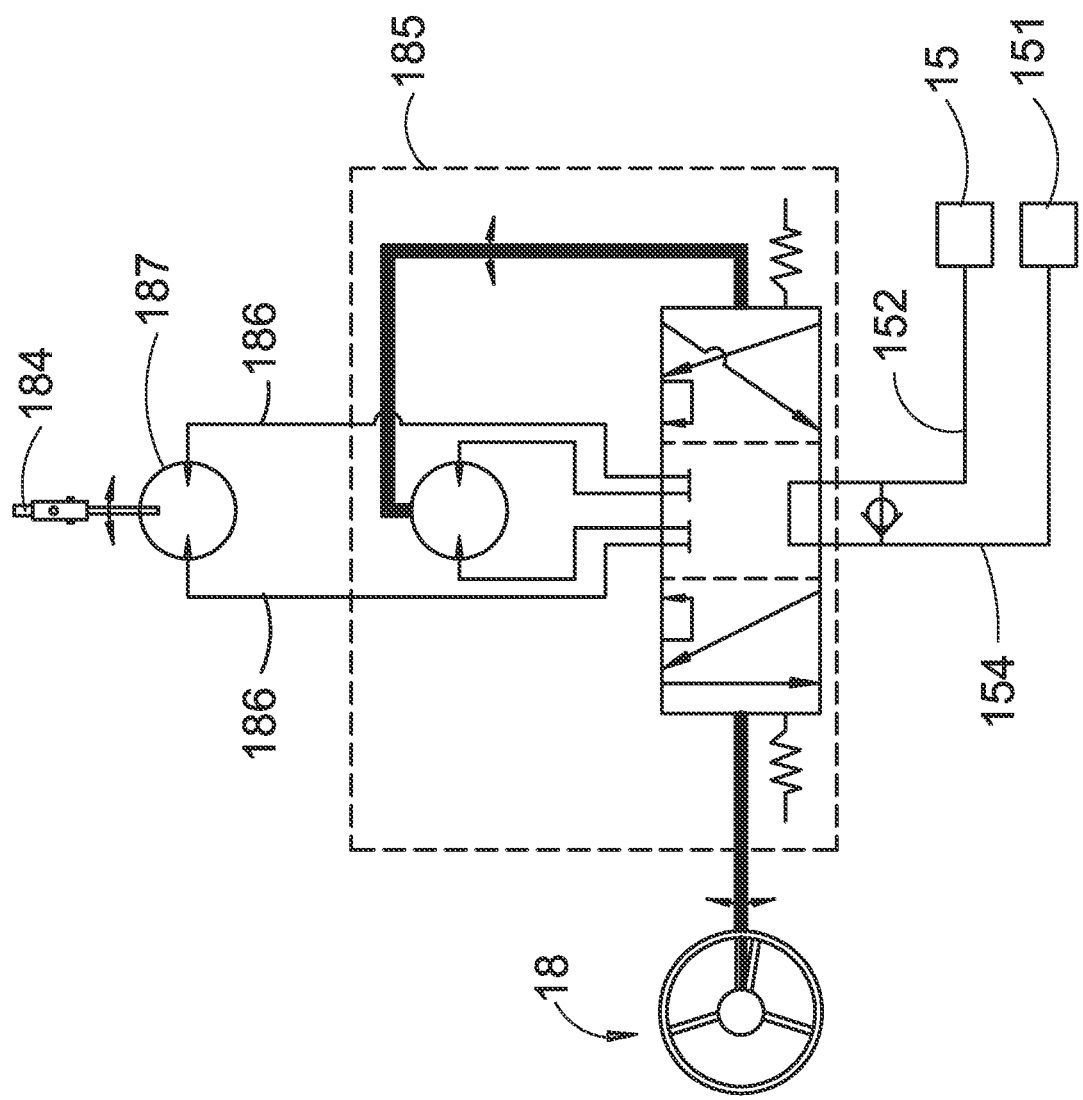
FIG. 3 is a diagram of a first embodiment of the hydraulic steering control circuit for the windrower of FIG. 1.

Referring now to FIGS. 3 and 4 in conjunction with FIG. 2, rotation of the steering input shaft 30 is accomplished by the steering drive motor 189. The steering drive motor 187 is connected to the main frame 10 and positioned proximate to the steering input shaft 30. An output shaft 189 from the steering drive motor is connected to the drive control mechanism 30 by a universal joint 188 and a sliding coupling 184. The connection allows minor axial misalignment between the steering drive motor 187 and the drive control mechanism 30 without resulting in binding or excessive wear in the motor or the mechanism. A pressurized fluid supply metered by steering control valve 185 causes the steering drive motor 187 to rotate, the direction of rotation being dependent upon the rotation of the steering wheel 18. Such fluid control valves are well-known in the art. In the exemplar embodiment described herein, the steering control valve is a dual displacement steering control unit, model Series 10 Dual Displacement by the Eaton Corporation. Pressurized hydraulic fluid is provided to the steering control valve 185 by pump 15 via pressurized supply 152. As used herein, pump 15 describes the combination of a hydraulic pump, relief valves, connection lines, orifii, and reservoir (tank 151) necessary to provide a specified flow of pressurized fluid to a control device, such as the instant steering control valve, and allow the device to function.

The steering control valve 185 directs pressurized fluid to the steering drive motor 187 via hydraulic lines 186 based on the turning input of steering wheel 18. For example, turning the steering wheel to the right directs pressurized fluid needed to rotate the steering drive motor in the direction necessary to cause right turning of the vehicle. A steady positioning of the wheel 18 (e.g., no directional change necessary) results in no fluid flow being directed to the steering drive motor and thus no movement of the control input shaft; the machine will continue with the same relative drive pump displacements along the same trajectory. Relief flow from the steering control valve 185 is returned to a fluid reservoir (tank) 151 by return line 154. An output shaft 189 from the steering drive motor is connected to the drive control mechanism 30 by a universal joint 188 and a sliding coupling 184.

Selection of the fluid delivery rate from the steering control valve 185 per unit of steering wheel turn input allows the ratio of steering wheel turns to control input shaft revolutions to be varied to achieve desired steering characteristics for the machine. Experience has shown that greater steering precision is achieved by using a relatively small thread pitch for drive threads 314, 316 and pintel arm blocks 144, 164. However, as thread pitch decreases the number of turns of the steering wheel necessary to effect a turn increases. A steering system requiring several complete revolutions of the steering wheel to reverse the course of the machine (e.g., an end of row U-turn) is tiresome for an operator. The present invention allows the ratio between the steering wheel input and the steering drive motor to be increased thereby allowing use of finer pitch threads than would normally be suitable in a straight mechanical interface and offers a more ergonomically appropriate number steering wheel turns to span the steering wheel lock-to-lock range.

Selection of a variable steering control valve with variable displacement enables the effective steering rate gain to be selectively altered. An input signal, shown at "A" shifts the valve to change the displaced fluid/per revolution, for example doubling the flow of fluid per unit of steering wheel input. In one embodiment, the input signal "A" is activated when the machine achieves a pre-determined travel speed so that the steering rate gain is optimized for vehicle operating speed ranges, a feature not possible with a straight mechanical steering interface. There are numerous known systems for monitoring machine travel speed and initiating a signal at a pre-determined speed. Any such system may be used in conjunction with the present invention to automate a shift in the steering ratio at a pre-determined speed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A mechanism of direction control for a differential speed steered agricultural machine comprising:

right and left drive motors;

right and left hydraulic drive pumps connected in tandem to and driven by an engine, each drive pump having a displacement control mechanism including a pintel arm rotatable between first and second positions, rotation of which changes hydraulic fluid flow rate from respective drive pumps to control speed and direction of respective drive motors;

a control input shaft connected to the left and right pintel arms, the shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction;

a steering drive motor connected to the control input shaft to rotate the shaft thereby managing relative displacement of the right and left hydraulic pumps; and a steering wheel connected to rotate a hydraulic steering valve to the right and left of a central position, the steering valve directing a varying volume of pressurized hydraulic fluid to the steering drive motor, the variation dependent upon the degree and direction of steering wheel rotation from the central position, thereby causing rotation of the control input shaft in proportion to the degree of rotation of the steering wheel, wherein the ratio of steering wheel rotation to steering drive motor rotation may be selectively varied.

2. The mechanism of claim 1, wherein the hydraulic steering valve further comprises a selector having a first position and a second position, rotation of the steering valve while in the first position causing rotation of the steering drive motor at a first rate, rotation of the steering valve while in the second position causing rotation of the steering drive motor at a second rate.

3. The mechanism of claim 2, wherein the selector position is shifted upon receipt of an input signal.

4. The mechanism of claim 3, wherein the input signal is representative of machine travel speed.

5. A mechanism of steering for a differential speed steered agricultural machine comprising:

right and left tandemly connected hydraulic drive pumps, each drive pump having a displacement control mechanism including a pintel arm rotatable between first and second positions, rotation of the pintel arms changing hydraulic fluid flow rate from respective drive pumps ranging from a full forward drive speed to a full reverse drive speed;

a control input shaft connected to the left and right pintel arms, the shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction;

a steering drive motor connected to the control input shaft for rotatation therewith thereby managing relative displacement of the right and left hydraulic pumps; and a hydraulic steering valve rotatable by a steering wheel to the right and left of a central position, the steering valve directing a varying volume of pressurized hydraulic fluid to the steering drive motor, the variation dependent upon the degree and direction of rotation from the central position, rotation of the steering control valve causing rotation of the steering drive motor and connected control input shaft in proportion to the degree of rotation of the steering wheel, wherein the ratio of hydraulic steering valve rotation to steering drive motor rotation may be selectively varied.

6. The mechanism of claim 5, wherein the hydraulic steering valve further comprises a selector having a first position and a second position, rotation of the steering valve while in the first position rotating the steering drive motor at a first rate, rotation of the steering valve while in the second position rotating the steering drive motor at a second rate.

7. The mechanism of claim 6, wherein a position of the selector is shifted upon receipt of an input signal.

8. The mechanism of claim 7, wherein the input signal is representative of machine travel speed.

9. The mechanism of claim 7, further comprising an actuator having a selectively variable length between generally opposing first and second ends, the first end connected to the control input shaft for movement therewith, the second end anchored to the hydraulic drive pumps, variation in the length thereof moving the control input shaft in either direction along its longitudinal axis independent of rotation of the control input shaft by the steering drive motor.

* * * * *